Nov. 26, 1963

L. C. H. JUY 3,111,855

CHANGE SPEED GEAR MECHANISM FOR BICYCLES
AND THE LIKE VEHICLES

Filed May 18, 1961

Nov. 26, 1963　　　　　　L. C. H. JUY　　　　　　3,111,855
CHANGE SPEED GEAR MECHANISM FOR BICYCLES
AND THE LIKE VEHICLES
Filed May 18, 1961　　　　　　　　　　　　　　　6 Sheets-Sheet 2
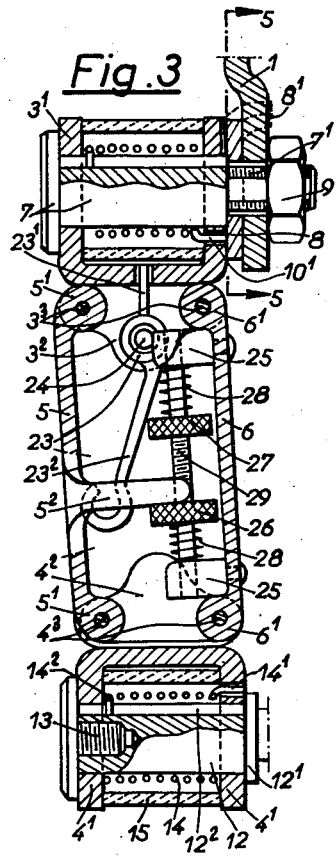
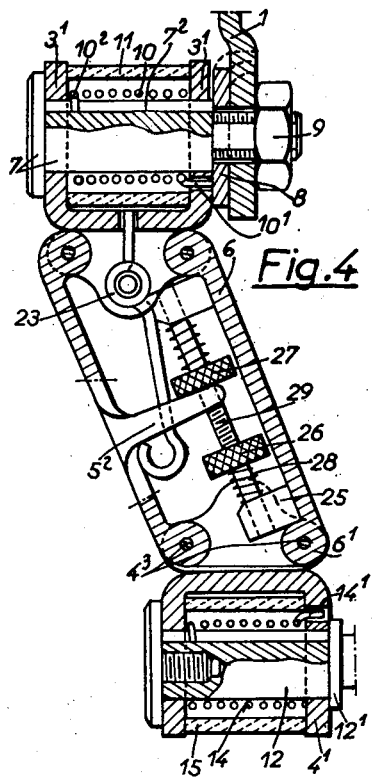
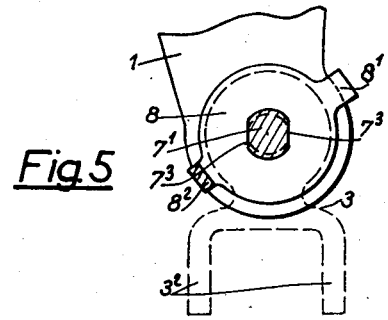

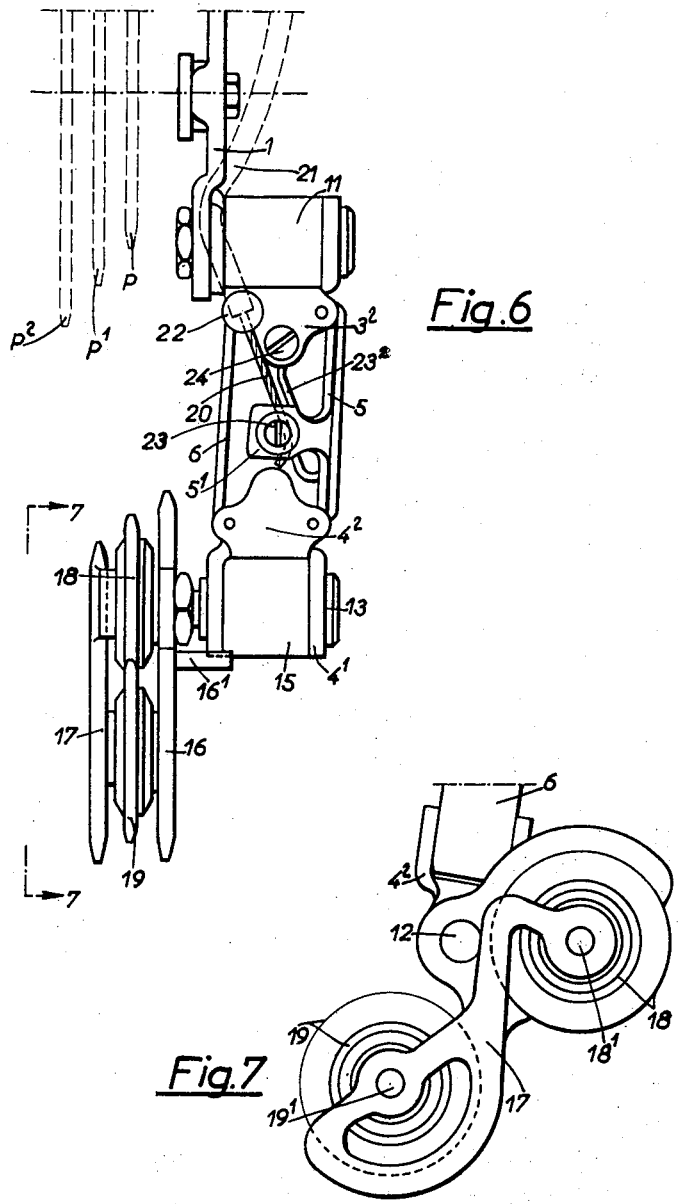

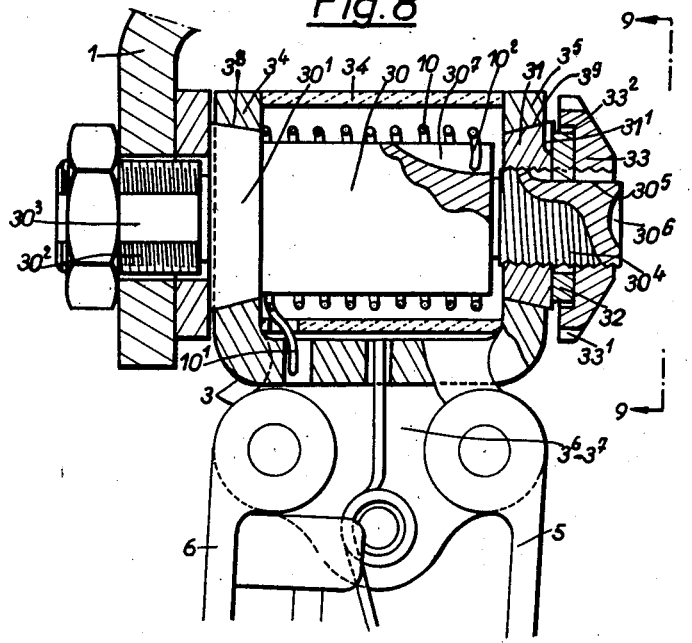

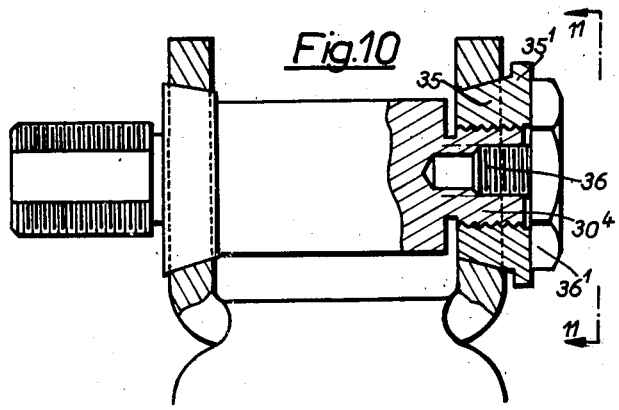
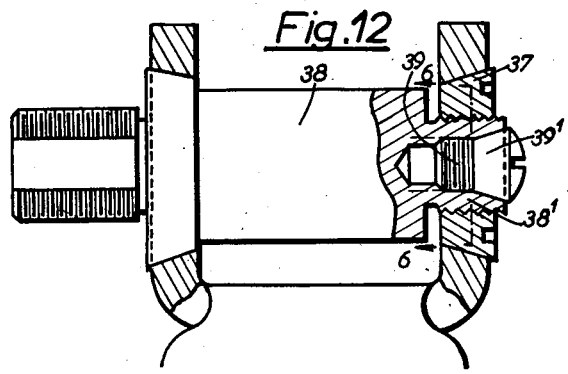
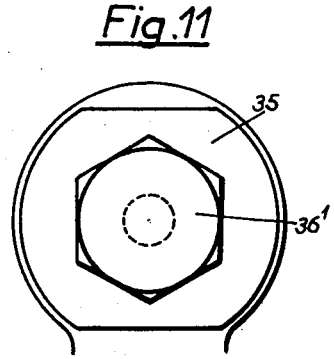
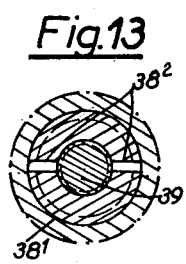

Nov. 26, 1963  L. C. H. JUY  3,111,855
CHANGE SPEED GEAR MECHANISM FOR BICYCLES
AND THE LIKE VEHICLES
Filed May 18, 1961  6 Sheets—Sheet 6

United States Patent Office 3,111,855
Patented Nov. 26, 1963

3,111,855
CHANGE SPEED GEAR MECHANISM FOR
BICYCLES AND THE LIKE VEHICLES
Lucien Charles Hippolyte Juy, 75 Rue General-
Fauconnet, Dijon, Cote-d'Or, France
Filed May 18, 1961, Ser. No. 110,915
Claims priority, application France May 31, 1960
17 Claims. (Cl. 74—217)

This invention relates to change-speed gear mechanisms of the type operating by chain-displacement for bicycles and similar vehicles.

Change-speed mechanism of the foregoing type are known in which the means or plurality of means for supporting the cycle chain and transversely entraining the said chain so as to displace it on the sprockets, are carried by an articulated parallelogram system, the said system being itself carried on the vehicle frame, generally within, or near the axis of the rear wheel.

An object of the invention is to devise a change-speed gear mechanism of the articulated parallelogram type, which is of improved construction and operation.

The change-speed gear mechanism according to the invention comprises, separately or in combination, the following constructional arrangements and features: a support lug formed with an open slot for securing in adjustable manner in the spindle of the rear cycle wheel, two identical supports cut out and folded in the form of a double yoke, the said supports being mounted parallel and connected together by parallel or substantially parallel levers, freely pivoted in the yokes relatively to the supports one of which is resiliently pivoted so as to tension the chain on the lower portion of the support lug, the chain-guide assembly, consisting of rollers rotating between cheek and counter-cheek being resiliently pivoted within the pivot of the second support; the transverse displacements of the chain-guide assembly, due to the pivoting of the levers, are controlled in one sense by any desired cable system, one end of which is attached to a bent lug of the external pivoting lever, and in the other direction by a recall spring secured to the upper support and acting against the said external pivoting lever, a triple stop device being provided on the one hand for limiting the pivoting of the upper support relatively to the support lug, secondly for limiting the pivoting of the chain-guide assembly relatively to the lower support, and finally for limiting, in the two directions and in an adjustable and pre-determined manner, the deformations of the parallelogram with the transverse displacement of the chain-guide assembly.

Various features of this construction will be apparent from the following description, notably: the precise and easy adjustment of the extreme positions of the chain-guide assembly by means of a screwthreaded rod secured to the inner pivoting lever and carrying two nuts with spring retarding means, the other lever carrying a folded lug cooperating with the stop nuts. According to a further feature of the invention, the line of the chain-guide assembly rollers is eccentric relatively to the pivoting axis of the said assembly. A further feature provides an assembly of the articulations of the supports such that it permits play take-up and precise adjustment, without any possibility of putting the mechanism out of order.

For a better understanding of the invention and to show how the same may be carried into effect, reference will now be made, by way of example, to the accompanying drawings, in which:

FIGURE 5 is a cross-sectional view taken along the line 5—5 of FIGURE 3,

FIGURE 6 is a side view taken along the line 6—6 of FIGURE 1,

FIGURE 7 is a detail view taken along the line 7—7 of FIGURE 6,

Figure 2:
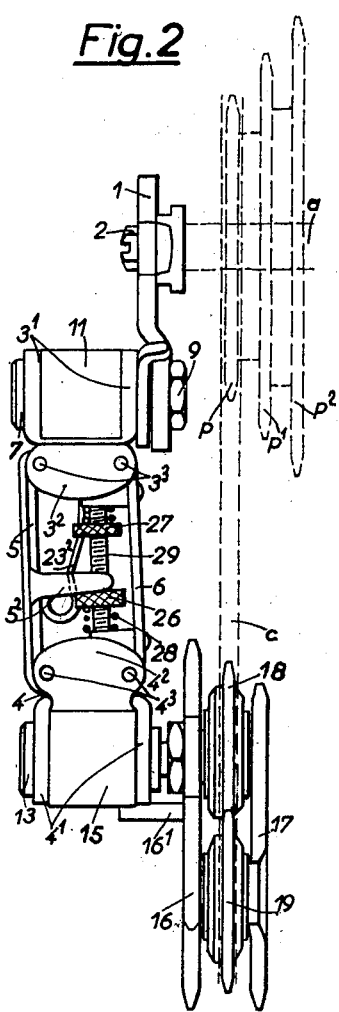
FIGURE 2 is a side view corresponding to FIGURE 1, FIGURES 3 and 4 are enlarged cross-sectional detail views of FIGURE 2, showing parts of the change-speed gear in two different operative positions.
Figure 1:
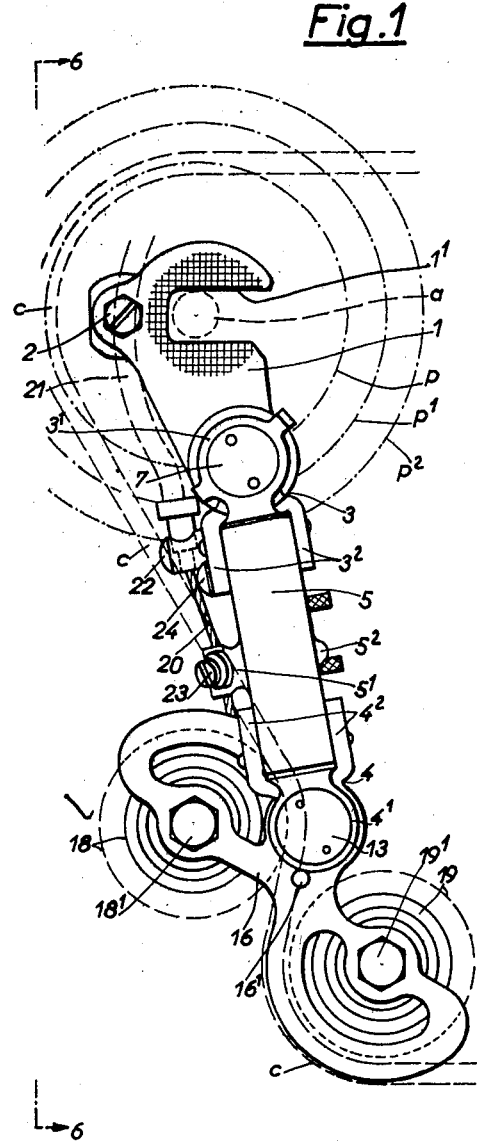
FIGURE 1 is a front view of a change-speed gear according to one embodiment of the invention.
Figure 14:
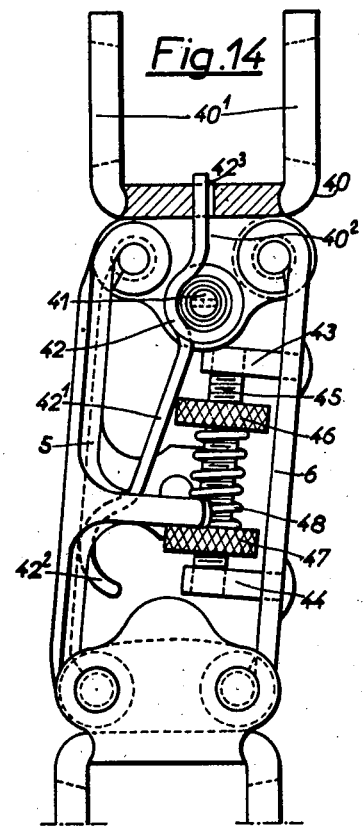
Figure 15:
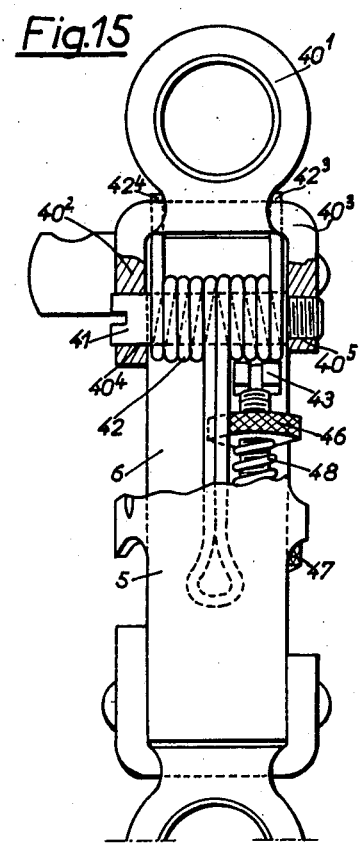
Figure 16:
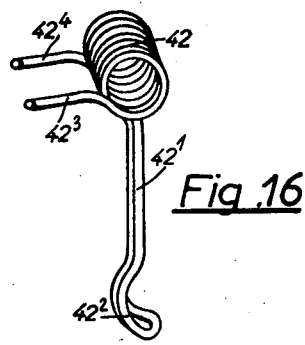

FIGURE 8 is an enlarged view in axial section showing a detail of FIGURE 6, and illustrating a play take-up articulation, FIGURE 9 is a detail view taken along the line 9—9 of FIGURE 8, FIGURE 10 is a view in axial section illustrating a modification of the play take-up articulation, FIGURE 11 is a side view taken along the line 11—11 of FIGURE 10, FIGURE 12 is a view in axial section illustrating a further modification of the play take-up articulation, FIGURE 13 is a cross-sectional view taken along the line 13—13 of FIGURE 12, FIGURE 14 is a part sectional view showing a modification of the articulated parallelogram, FIGURE 15 is a front view shown partly in section and corresponding to FIGURE 14, and FIGURE 16 is a perspective view of a detail of FIGURE 14.

Referring to the drawings, the change-speed gear illustrated comprises a support lug 1 of known type having an open slot $1^1$ for engagement in adjustable manner on a spindle $a$ of the rear cycle hub carrying stepped sprockets $p$—$p^1$—$p^2$, these sprockets and the associated chain being shown in broken lines. A bolt and nut system 2 secures the support lug 1 against the lug of the bicycle frame.

The change-speed gear comprises furthermore two supports whereof an upper support 3 is intended to be carried in a pivoting manner on a prolongation of the lug 1 and a lower support 4 is intended to carry the chain-guide assembly of the change-speed gear.

In order to simplify manufacture, the two supports 3 and 4 are identical and are formed of sheet metal cut and folded in the form of double opposite yokes having sides $3^1$—$3^2$ and $4^1$—$4^2$ respectively. The sides of the yokes $3^2$ and $4^2$ are disposed opposite each other and each of them carries two parallel articulation spindles $3^3$ and $4^3$ on which are freely pivoted, between the said sides $3^2$—$4^2$, levers 5 and 6 respectively of flat or profiled form and terminating in bosses $5^1$—$6^1$ through which pass the spindles $3^3$ and $4^3$.

The levers 5 and 6 are preferably of equal length, whereas the spindles $3^3$ on the one hand and the spindle $4^3$ on the other hand are equidistant from each other, so that these members constitute an articulated parallelogram. The lever 5 is considered as an outer lever, whereas the lever 6 is considered as an inner lever, being nearest to the chain and the pinions.

The sides $3^1$ of the upper support 3 are intended for the articulated mounting of the support and of the change-speed assembly of the lug 1. The assembly axis consists of a bolt 7 (FIGURE 3) the head of which may be flat or round with simple entrainment perforations. The smooth rod of the spindle 7 passes freely through the sides $3^1$. The screw-threaded end $7^1$ of the spindle 7 has a smaller diameter and passes through a washer 8 as well as the lug 1. A nut 9 locks together the spindle 7, the washer 8 and the lug 1.

On assembly, a spring 10 is engaged about the smooth bearing surface of the spindle 7. One end $10^1$ of this spring is engaged in an aperture in one side $3^1$ of the support 3. The other end $10^2$ of the spring is engaged in a slot $7^2$ along the smooth bearing surface of the spindle 7. Also during assembly, there is disposed between the sides $3^1$ of the support yoke 3 a ring 11 (of plastic material, metal, rubber or the like) which protects the spring and spindle from disturbance.

Furthermore, the washer 8 is held in rotation with the spindle 7, the bearing surface $7^1$ of which is formed with one or two flats $7^3$ co-operating with flats in the axial aperture of the washer 8 (FIGURE 5). The washer 8 has lugs $8^1$—$8^2$ which are turned down diametrically and inversely. In this way, it is possible to impart circular tension forces on the spring 10 in a direction tending constantly to pivot the support 3 and the change-speed assembly in a clockwise direction, so as to tension the chain. The lug $8^1$ of the washer 8 bears and is permanently stopped against the support lug 1. The lug $8^2$ constitutes, relatively to the support 3, a stop limiting the rearward pivoting of the change-speed gear, thus facilitating disassembly of the wheel.

In a comparable manner, the sides $4^1$ of the lower support yoke 4 carry a freely pivoting spindle 12 one shoulder $12^1$ of which abuts against one of the sides $4^1$. A screw 13, having for example a round and smooth head, with simple entrainment perforations, connects the end of the spindle 12 relatively to the sides $4^1$ of the support 4, without hindering independent, relative, angular, free displacement between the support 4 and the spindle 12.

On assembly, a spring 14 is engaged about the spindle 12 between the sides $4^1$. One end $14^1$ of the spring 14 is engaged in an aperture of one side $4^1$. The other end $14^2$ of the spring is engaged in a slot $12^2$ along the smooth bearing surface of the spindle 12. Also on assembly, a projecting ring 15 of plastic material or the like is disposed between the sides $4^1$.

The arrangement provides a double articulation system including two articulation points associated with spindles 7 and 12, each of which articulation points is controlled with normal pressure by a spring.

This double articulation system acts in the following manner:

When the chain is moved laterally from one sprocket of the free wheel to another sprocket, the assembly comprising the roller-carrying cheeks and the chain guide is inclined rearwardly or forwardly, whilst pivoting on the lower articulation 12. If there is an excess tension in the chain, it is automatically corrected by the inclination of the assembly of the apparatus oscillating on the upper articulation 7.

This feature allows the taking up of a considerable chain undulation resulting from great spacing between the teeth and furthermore because it permits greater winding flexibility. This flexibility permits the elimination of unforseen irregularities, such as hard links, grit on the chain, etc.

The other end of the spindle 12 is fast in any known manner with a cheek 16 of any desired folded, cutout or stamped material, which is appropriately profiled so as to carry, in co-operation with a corresponding counter-cheek 17, the spindles $18^1$ and $19^1$ of two chain guide rollers 18 and 19 mounted for free rotation. The cheeks, counter-cheeks, spindles and rollers constitute the chain-guide assembly. A feature of this assembly resides in the spacing or eccentricity relatively to the spindle 12 of the imaginary line joining the axes of the rollers 18 and 19. The effect of this eccentricity is to lower, relatively to the pinions $p$—$p^1$—$p^2$, the position of the roller 18, towards the upper roller, thus permitting easier passage of the chain onto the large-diameter pinion $p^2$. Thus, this combination increases the capacity of the apparatus, permitting the use of a pinion $p^2$ of larger diameter.

The circular tension imparted by the spring 14 tends to entrain in rotation the chain guide assembly (in a clockwise direction), thus tensioning the chain. However, a rod $16^1$ is provided, which rod is integral with a cheek 16, abutting against the support 4 and thus limiting the forward pivoting of the chain guide assembly. This limitation facilitates disassembly and reassembly of the bicycle rear wheel.

The deformatitions of the articulated parallelogram, i.e. the pivoting of the levers 5 and 6 with corresponding transverse displacement of the chain guilde assembly, are controlled in the sense of displacement towards the large pinion $p^2$ by any known system comprising a lever or the like and actuating a cable 20 guided and protected by a sheath 21 (shown in broken lines in FIGURE 6). The sheath 21 is supported in the sheath retaining means 22 prolonging the pivot $3^3$ of the inner lever 6. The end of the cable is secured by a screw and washer system 23 for example on a securing lug $5^1$ of the lever 5. Emphasis is given to the position of the lug $5^1$ which is nearer to the pivot $4^3$ than to the pivot $3^3$ of the lever 5. On the other hand, the lug $5^1$ is prolonged to a position near the inner lever 6. The pivoting arm relatively to the pivot $3^3$ of the lever 5 is as large as possible and these arrangements facilitate the pivoting of the lever 5 and consequently of the articulated system, thus permitting extremely gentle operation of the chain speed gear.

In the other direction, the transverse displacements are controlled by a spring which is mounted on a pivot 24 of a side $3^2$ of the support 3. A portion $23^1$ of the spring is secured in any desired manner to the support 3. The other portion $23^2$ is prolonged downwardly so as to act within and against the lever 5. The portion $23^2$ is mantained for example by the concave profile of the lever 5 and also between the lug $5^1$ and a lug $5^2$ the use of which is described later.

The lug $5^2$ is for example cut out and folded with the lever 5. This lug is prolonged as far as a point near a screwthreaded rod 29 the ends of which are positioned and secured in heads 25 secured to the ends and along one side of the inner lever 5. Two knurled nuts 26 and 27 are screwed along the rod 29 on either side of the lug $5^2$. Springs 28 are assembled about the rod 29, in compression between the nuts and the head 25, in such manner as to retard the rotation of the nuts and to maintain them in their axial positions along the rod 29.

This manual adjustment device limits, in both directions, the transverse displacement of the chain guide assembly, i.e. of the chain $c$ on the outermost pinions (in the case illustrated: the pinions $p$ and $p^2$). FIGURES 3 and 4 illustrate these outermost positions which it is possible to regulate easily and with precision, in an accessible manner, by means of the knurled nuts 26 and 27 against which abuts the lug $5^2$.

FIGURES 8 to 12 show various embodiments of the device for the adjustable assembly and play take-up with respect to the articulation of the upper support 3. The arrangements are exactly the same for the lower articulation, with regard to the lower support 4 relatively to the pivot of the chain guide assembly.

Referring now to the embodiment illustrated in FIGURES 8 and 9. These FIGURES show the upper support 3 manufactured from cut-out and folded sheet metal and having the form of a double yoke the sides $3^4$ and $3^5$ of which serve for the mounting of the articulation pivot 30, whereas the sides $3^6$, $3^7$ pivotally carry the levers 5 and 6 constituting the articulated parallelogram.

The side $3^4$ of the articulation yoke of the support 3 is formed with a conical aperture $3^8$ in which is fitted a corresponding conical portion $30^1$ of the spindle 30. On the side at which it is secured to the support lug 1, (or to the chain guide assembly provided with rollers for the lower articulation pivot), the pivot 30 has a screwthreaded portion $30^2$ with angular-position flats $30^3$. At the other end, the pivot 30 has a screwthreaded bearing surface $30^4$ for co-operation with a movable cone 31. The latter may thus be fitted with precision in the corresponding conical aperture $3^9$ of the side $3^5$ of the yoke for the articulation of the support 3 (easily accessible external side of the change speed gear). The movable cone 31 may be formed with one or more apertures or notches $31^1$ facilitating adjustment.

Following on the cone 31, there is engaged on the bearing surface $30^4$, freely and in a manner which does not involve screwing, a washer 32 having a flat projecting within its bore, for the angular positioning of the said washer on a corresponding flat $30^5$ of the bearing surface $30^4$.

A counter-nut 33 is finally screwed on the bearing surface $30^4$, so as to lock the cone 31 in the adjustment position adopted. The effect of the counter-nut 33 on the cone 31 is exerted through the agency of the washer 32 having a constant angular position, so that the cone 31 is not disturbed when locking the counter-nut 33.

The counter-nut 33 may be formed with peripheral notches $33^1$ for actuation by means of special spanners. Of course, the counter-nut 33 may also be provided with any other means for gripping and entrainment, without departing from the scope of the invention.

The external end $30^6$ of the spindle 30 may be formed in any useful or decorative manner (decorative motifs, concave stamping, paintings, polishing, etc.).

Attention should be given to the circular recess $33^2$ of the counter-nut 33, in which the washer 32 is partially embedded, thus permitting the diminution of the bulk or projection of the support 3.

The articulation comprises furthermore the resilient, circular spring 10 secured on the one hand, for example at $10^1$, on the end of the double yoke 3 and, on the other hand, at $10^2$ in a slot $30^7$ machined in the spindle 30. A ring 34 protects the articulation. The same applies to the embodiments illustrated in FIGURES 10 and 12, although these figures have not been completed in this respect.

The embodiment illustrated in FIGURES 10 and 11 exhibits the characteristic arrangements previously described, except with regard to the locking of the movable independent cone 35. The latter is screwed, for purposes of adjustment and play take-up, on the screw-threaded bearing surface $30^4$ and it has for example a collar $35^1$ provided with entrainment flats, or other gripping engagements for the actuation thereof. A simple screw 36 screwed into the end of the spindle 30 ensures the locking of the cone 35. The screw 36 may have a hexagonal head $36^1$ or a cylindrical head formed with flats, or any other type of head which is simultaneously decorative and permits the actuation thereof. The bulk is diminished, for example by forming a chamber or recess in the end of the cone 35, in order that the head of the screw 36 may be at least partially embedded.

A further embodiment is illustrated in FIGURES 12 and 13, particularly with regard to the locking of the movable independent cone 37 after the taking up of play and adjustment. In this case, the screwthreaded bearing surface $38^1$ of the spindle 38 is apertured, screwthreaded and axially milled at its end so as to receive a screw 39 having a conical head $39^1$. Furthermore, the bearing surface $38^1$ is diametrically split at $38^2$ (FIGURE 13), once or several times. Consequently, when screwing the screw 39, radial expansion of the bearing surface $38^1$ is produced and the cone 37 is locked. The slot or slots $38^2$ may serve as a point of attachment to one end of the spring 10. The conical head of the screw 39 may, externally, constitute a means of decoration.

The embodiment illustrated in FIGURES 14, 15 and 16, relates more particularly to the execution and mounting of the spring acting as a recall means on the levers of the articulated parallelogram and also to the carrying into effect of the device for adjusting the transverse displacements of the chain guide assembly. It was desired to make the recall spring more robust and stronger, by mounting it in a more satisfactory manner.

In this embodiment, the levers of the articulated parallelogram are still designated 5 and 6.

The upper support 40 having the form of a double yoke exhibits upper sides $40^1$ and lower sides $40^2$—$40^3$ in which are formed, respectively, a smooth aperture $40^4$ and a tapped aperture $40^5$ for the mounting and movable securing of a spindle 41 the purpose of which it is to carry the recall spring to be described hereinbelow.

The spindle 41 is screwed until it abuts against the inner face of the side $40^3$. The return spring 42 is mounted on the spindle 41 between the sides $40^2$ and $40^3$. This spring is formed with contiguous cylindrical turns constituting the spring proper, and it is divided into two equal parts having a different winding direction in respect of each of the parts which are connected by their lower connecting strands $42^1$ terminating in a loop $42^2$ of appropriate profile so as to bear within and against the lever 5 of the parallelogram. The extreme strands $42^3$—$42^4$ of the spring are symmetrical and have, for example, as illustrated in FIGURE 16, a 90° position relatively to the limb $42^1$. The strands $42^3$—$42^4$ are secured in apertures formed for this purpose in the end of the upper support, thus imparting to the spring 42 a resilient tension thrust against the lever 5.

This embodiment is advantageous, mainly due to:

The elimination of "cantilever" effect in the assembly pivot of the recall spring. The spring 42 is firmly guided and carried transversely since the pivot 41 is supported at the two ends on the sides $40^2$—$40^3$. The substantial increase in the number of turns of the spring 42 further improves guiding and positioning;

The action of the spring 42 is improved due to improved equilibrium (symmetrical formation, symmetrical securing). The mechanism functions much more gently, due to an increase in the number of turns;

Safety is increased, since the upper strand and the lower limb of the spring, which theoretically constitute weak points, are duplicated.

Alternatively, the spring 42 may be replaced by two separate symmetrical springs mounted under the same conditions and combining the same advantages.

The mounting of the spring 42 implies a modification of the device for control of transverse displacement, as previously described.

The studs 43 and 44, integral with the lever 6, are drawn near to each other. In a corresponding manner, the length of the screw threaded rod 45, on which are screwed the knurled adjustment nuts 46, 47, has been reduced, and the retarding of the knurled nuts is effected by means of a single compression spring 48.

Emphasis is given to the simple, economical and rational construction of this change speed gear, notably due to:

The possibility for extremely precise and rapid manual adjustment without the aid of any tool or instrument, of the amplitude of transverse displacement of the chain guide assembly;

The possibility of locking the chain guide assembly on one of the pinions of the freewheel (for example the middle pinion $p^1$) (in case of a functioning "incident" such as the breaking of the cable 20), by proceeding rapidly to the adjustment of the nuts 26 and 27 which then abut against the lug $5^2$ on either side thereof;

The simple and effective abutment system, relatively to the supports 3 and 4;

The eccentricity at the front of the point of attachment of the assembly with the rearward chain guide and roller-carrying portion;

The economical cut-out and folded formation of various members;

The protection of the springs surrounding the pivots of the supports;

The attachment of the cable to the external lever, providing exeremely gentle functioning;

The easy play take-up and the precise adjustment of the upper and lower articulations.

There may, if required, be provided, in combination with the support or the external lever, a gap or concealing means for protection of the adjustment device and of the spring between the levers 5 and 6. This cap may be pivotal to provide access to the various knurled nuts for manual adjustment.

I claim:

1. A change speed gear mechanism for a bicycle or the like vehicle, comprising a support lug for supporting the mechanism on the vehicle, two identical supports each in the form of a double yoke respectively constituting upper and lower supports, substantially parallel levers extending between said supports, means freely pivoting said levers in correspding yokes of said supports to form an articulated parallelogram in which said supports are maintained parallel to each other by said levers, means connecting one of said supports to said support lug for resilient pivotal movement thereabout, a chain guide assembly adapted for moving a chain transversely from one sprocket to another, means connecting said chain guide assembly to the other of said supports for resilient pivotal movement thereabout such that said supports are each independently pivotal about respective axes, control means operatively coupled to the articulated paralielogram for displacing the chain guide assembly transversely in a first direction, return spring means operatively coupled to the articulated parallelogram for displacing said chain guide assembly transversely in a direction opposite to said first direction, a first stop device for limiting pivotal movement of said one support relatively to said support lug, a second stop device for limiting pivotal movement of the chain guide assembly relatively to said other support and a third stop device for limiting angular deformation of the articulated parallelogram in both directions during transverse displacement of the chain guide assembly, said third stop device including manually adjustable means for pre-determining the limits of said angular deformation for adjusting transverse displacement of said chain guide assembly.

2. A mechanism according to claim 1, wherein the means establishing the pivotal connection of the supports comprises two conical bearing surfaces of opposite conicity in each support, a pivot in each support and including a conical bearing surface complementary to and engaged against one of the bearing surfaces, an independently axially movable cone adapted to engage the other conical surface of each support to control play between the supports and the pivots, each pivot having a threaded surface, the cones being respectively threaded on said pivots and adjustable thereon to control engagement of the cone in the respective conical surface of the supports and means for locking the movable cone in a desired relative adjusted position in the conical bearing surface.

3. A mechanism according to claim 1 wherein said upper and lower supports are each constituted by a cut-out blank of sheet metal folded to double yoke shape, said means which connects said one support to said support lug being associated with one of the yokes of the upper support, said means which connects the chain guide assembly to the other of the supports being associated with a corresponding yoke on the lower support, the mechannism comprising parallel pivots in the other of the yokes of each support pivotally connecting adjacent ends of the associated levers.

4. A mechanism according to claim 1, wherein the means establishing resilient pivotal connection between said upper support and said support lug comprises a pivot spindle extending through the support yoke adjacent said lug, a washer between said spindle and lug, means for locking said pivot spindle against said washer and lug, spring means between the pivot spindle and the upper support, said first stop device comprising means restraining angular rotation of said washer relative to said pivot spindle, said washer including diametrically opposed abutment lugs directed in axially opposite directions, one of said abutment lugs bearing against the support lug and the other of said abutment lugs engaging the upper support to limit pivoting movement of the support and of the change speed assembly in one direction only.

5. A mechanism according to claim 1, wherein the chain guide assembly comprises a cheek and a counter-cheek, rollers rotatably mounted between said cheeks, a spindle mounted for pivotal movement in the lower support, said chain guide assembly being rigid with said spindle, and spring means between said lower support and said spindle.

6. A mechanism according to claim 4 comprising protective cylindrical rings of plastic material mounted in the yokes of said upper and lower supports and covering the pivots and springs of the associated supports.

7. A mechanism according to claim 1, wherein the chain guide assembly comprises rollers for guiding the chain, said rollers having axes lying on a line eccentrically located relative to the axis of said lower support about which said chain guide assembly is pivotable.

8. A mechanism according to claim 1, wherein the return spring means of the articulated parallelogram is a spring mounted in the upper support, the latter spring having one end secured in said support and another end projecting from said support and in contact with one of the levers of said articulated parallelogram.

9. A mechanism according to claim 1, wherein the third stop device comprises a lug on one of the levers of said articulated parallelogram, a threaded rod supported on the other lever of said articulated parallogram, the lug being adjacent the threaded rod and movable relative thereto as said parallelogram is deformed, two knurled nuts threadably engaged on said rod for adjustment therealong and retarding springs mounted about the rod and positioned between the nuts and opposite ends of said rod, each nut limiting the movement of the lug in one direction.

10. A mechanism according to claim 1, wherein said control means comprises a sheathed cable device for controlling the transverse displacement of said chain guide assembly, the cable device having one end fixedly secured to one of the pivots connecting one of the levers to the upper support, a lug on the other of the levers extending between the supports and located nearer to the lower support, said lug lying on a line which is angularly rotated in a clockwise direction about the upper support relative to a line joining the supports, the cable of said cable device having an end secured to said lug.

11. A mechanism according to claim 2, wherein the means for locking the movable cone comprises a counter-nut threadably engaged on the pivot, a washer between the counter-nut and the cone, said counter-nut abutting against the washer which in turn abuts the movable cone, said washer being freely mounted on the bearing surface of the pivot for axial movement, but angularly coupled thereto.

12. A mechanism according to claim 2, wherein the means for locking the movable cone includes a screw threadably engaged in the pivot, the head of the screw abutting against said cone.

13. A mechanism according to claim 2, wherein the means for locking the movable cone comprises a screw having a conical head, the screw being threadably engaged in the pivot, said pivot having a conical surface complementary to that of the head of the screw and provided with at least one diametrical slot so as to undergo radial expansion upon penetration of the head of the screw to lock the movable cone against the support.

14. A mechanism according to claim 2, comprising means on the means for locking the cone in the bearing surface of the support facilitating the manual operation thereof, said means for locking the cones being provided with a recess to enable accommodation of a washer.

15. A mechanism according to claim 1, wherein the return spring means includes a pivot supported in the upper support, a return spring on the latter said pivot, said spring comprising two inverse windings of contiguous turns connected by a central double lower limb common to both, the end of said limb abutting against said other lever of the articulated parallelogram, the two outer-most ends of said spring being resiliently engaged in the upper support.

16. A mechanism according to claim 2, wherein the return spring means of the articulated parallelogram comprises two symmetrical springs, which are separate and conjoined, and which have a common mounting.

17. A mechanism according to claim 1, wherein the third stop device comprises a threaded rod carried by one lever, a cooperating lug on the other lever, adjusting nuts on said rod, and a single compression spring disposed between said nuts.

References Cited in the file of this patent
FOREIGN PATENTS

| | | |
|---|---|---|
| 726,801 | Great Britain | Mar. 23, 1955 |
| 1,081,431 | France | June 9, 1954 |